(12) United States Patent
Baumann

(10) Patent No.: US 7,497,887 B2
(45) Date of Patent: Mar. 3, 2009

(54) DEVICE FOR SEPARATING IMPURITIES FROM THE LUBRICATING OIL OF AN INTERNAL COMBUSTION ENGINE

(75) Inventor: Dieter Baumann, Greven-Gimbte (DE)

(73) Assignee: Hengst GmbH & Co., KG, Munster (DE)

( * ) Notice: Subject to any disclaimer, the term of this patent is extended or adjusted under 35 U.S.C. 154(b) by 563 days.

(21) Appl. No.: 10/521,188

(22) PCT Filed: Feb. 13, 2003

(86) PCT No.: PCT/EP03/01412

§ 371 (c)(1),
(2), (4) Date: Jun. 10, 2005

(87) PCT Pub. No.: WO2004/007052

PCT Pub. Date: Jun. 22, 2004

(65) Prior Publication Data

US 2005/0236322 A1    Oct. 27, 2005

(30) Foreign Application Priority Data

Jul. 12, 2002    (DE)    .............................. 202 11 556 U

(51) Int. Cl.
*B01D 35/00* (2006.01)
(52) U.S. Cl. .................... 55/385.3; 55/315; 55/502; 55/498; 55/510; 55/DIG. 17; 210/315; 210/440; 210/443; 210/493.2; 210/493.5; 210/497.2
(58) Field of Classification Search ............. 55/385.3, 55/315, 502, 498, 510, DIG. 17; 210/315, 210/440, 443, 493.2, 493.5, 497.2
See application file for complete search history.

(56) References Cited

U.S. PATENT DOCUMENTS

| 5,002,593 A | * | 3/1991 | Ichishita et al. ............... 96/137 |
| 5,114,572 A |   | 5/1992 | Hunter et al. |
| 5,429,101 A | * | 7/1995 | Uebelhoer et al. .......... 123/572 |
| 5,603,829 A |   | 2/1997 | Baumann |
| 5,607,500 A | * | 3/1997 | Shamine et al. ............... 96/144 |

(Continued)

FOREIGN PATENT DOCUMENTS

DE    43 06 431 C1    7/1994

(Continued)

*Primary Examiner*—Duane S Smith
*Assistant Examiner*—Minh-Chau T Pham
(74) *Attorney, Agent, or Firm*—Greer, Burns & Crain Ltd.

(57) ABSTRACT

Devices for separating impurities from the lubricating oil of an internal combustion engine, the devices at least having a filter element and a housing provided with a screw cap. The screw cap and the filter element include a detachable connection arrangement which can be brought into contact and are used to transmit axial tractive forces. A first device is characterized in that the connection arrangement can be brought into contact by rotating the screw cap in the loosening rotational direction thereof and can be disengaged by rotating the screw cap in the tightening rotational direction thereof. A second device also includes a centrifuge located in the same housing, a first connection apparatus, corresponding to the above-mentioned connection apparatus being provided between an intermediate cap and the filter element, and a second connection apparatus being provided between the screw cap and the intermediate cap.

33 Claims, 13 Drawing Sheets

U.S. PATENT DOCUMENTS

| | | | | |
|---|---|---|---|---|
| 5,674,393 | A | * | 10/1997 | Terhune et al. ............... 210/315 |
| 5,851,269 | A | * | 12/1998 | Strope ......................... 96/144 |
| 5,961,698 | A | * | 10/1999 | Dossaji et al. ................. 96/130 |
| 6,527,839 | B2 | * | 3/2003 | Fornof et al. .................. 96/136 |
| 7,008,472 | B2 | * | 3/2006 | Fornof et al. .................. 96/136 |

FOREIGN PATENT DOCUMENTS

| | | |
|---|---|---|
| DE | 195 23 239 A | 1/1996 |
| DE | 296 10 290 | 8/1996 |
| WO | WO 90 02597 A | 3/1990 |

* cited by examiner

DEVICE FOR SEPARATING IMPURITIES FROM THE LUBRICATING OIL OF AN INTERNAL COMBUSTION ENGINE

BACKGROUND OF THE INVENTION

The present invention relates to a device for separating impurities from the lubricating oil of an internal combustion engine, said device comprising a filter element, wherein said filter element is arranged in a two-piece housing that is closed during operation of the device and comprises a stationary lower housing part and a removable upper screw cap and wherein said screw cap and said filter element comprise detachable connection means which can be brought into contact and are used to transmit axial tractive forces, wherein the filter element is removed from the housing by means of these connection means when the screw cap is rotated in its loosening rotational direction.

Furthermore, the present invention relates to a device for separating impurities from the lubricating oil of an internal combustion engine, said device comprising a filter element at its bottom and, on top of said filter element, a centrifuge with a rotor drivable by means of lubricating oil flowing through it, wherein said filter element and said centrifuge are arranged, one above the other, in a common two-piece housing that is closed during operation of the device and comprises a removable upper screw cap and a stationary lower housing part, wherein a removable intermediate cap is arranged in the housing between said filter element and said centrifuge, said intermediate cap and said filter element comprising first detachable connection means which can be brought into contact and are used to transmit axial tractive forces, and wherein said centrifuge, said intermediate cap and said filter element can be removed from the housing while the latter is in its open state.

A device of the first aforementioned type is, for example, known from DE 296 10 290 U1, which describes a device that is designed as a fluid filter and which provides that the upper end disk of the filter element is provided with locking tongues that are projecting towards the top and can be mounted elastically. With the device being in the assembled state, these locking tongues engage a continuous locking groove extending along the internal perimeter of the screw cap. This permits removal of the screw cap, along with the filter element, from the filter housing by rotating said screw cap in its loosening rotational direction, this allowing the filter element to be handled easily when being replaced, wherein it is not necessary to directly seize the dirty and oily filter element. Usually, a used-up filter element is separated from the screw cap by canting the two parts against each other until the locking connection is undone. This requires canting beyond a certain angle to ensure that the locking connection will indeed be undone. In the case of screw caps which provide only little lateral motional play for the filter element partially arranged therein, this especially being the case with relatively long screw caps, it is not possible to undo the locking connection by canting because the deflection angle required between the two parts fails to be achieved since the filter element touches the internal perimeter of the screw cap beforehand. In this case, great effort is required to undo the locking connection by exerting a tractive force in an axial direction. To achieve this, the dirty filter element must be seized, and in this process, contaminated lubricating oil may easily be released into the environment. In addition, it is difficult to exert the necessary tractive force at all when seizing an oily filter element.

A device of the second aforementioned type is known from DE 43 06 431 C1. If the screw cap, as a removable part of the housing of this known device, is rotated in its loosening rotational direction, initially only the screw cap, in its thread, moves away from the stationary part of the housing in an upward direction, whereas the centrifuge rotor that is arranged in the upper part of the housing remains in its position. After the housing cap has been removed, the rotor of the centrifuge is positioned in its lower bearing. In the next step, the centrifuge rotor can be removed. Thereafter, the intermediate cap is accessible. The intermediate cap must be pulled out of the lower part of the housing in an upward direction. Therein, the intermediate cap takes along the filter element that is arranged below it, thus also removing it in an upward direction. This taking along is initiated by the first detachable connection means between the intermediate cap and the upper end disk of the filter element. After the combined unit consisting of intermediate cap and filter element has been removed, the filter element can, by canting or by exerting a tractive force in axial direction, be disengaged from and pulled out of the intermediate cap, and a new filter element can be inserted in the intermediate cap and engaged therewith via the detachable connection means by exerting a thrust force in axial direction. As compared with its disassembly, the device is then assembled in reverse order by first introducing the intermediate cap including filter element in the lower part of the housing. Thereafter, the centrifuge rotor is placed onto the intermediate cap with its lower bearing. Finally, the screw cap is screwed on, while it must be ensured that the upper bearing of the centrifuge rotor assumes its desired position in the center of the upper end of the screw cap. Obviously, disassembly and assembly of this device are relatively complicated and troublesome. In addition, disassembly requires that oily parts, in particular the intermediate cap, be seized manually. Apart from operating personnel getting their hands dirty, this poses the further problem that it is difficult to get a sufficiently firm hold of the intermediate cap because of its oily surface. As a result, it is even more difficult to pull out the intermediate cap from the lower part of the housing against the developing frictional forces and against a vacuum that might possibly be present.

SUMMARY OF THE INVENTION

Therefore, the present invention aims at creating devices of the aforementioned type, which obviate the drawbacks described above and which allow, in particular, disassembly and assembly to be carried out in an easier, faster and cleanlier manner.

A first solution to this problem is provided by the invention by a device of the first aforementioned type, characterized in that the connection means can be brought into contact by rotating the screw cap in the loosening rotational direction thereof and can be disengaged by rotating the screw cap in the tightening rotational direction thereof.

The device according to the invention is advantageous in that the connection means can, if necessary, be brought into contact and be disengaged by a simple rotary motion. Therein, engaging and disengaging practically do not require any effort as is the case with a locking connection when the locking connection is to be established or undone. At the same time, however, the device according to the invention ensures that, when the screw cap is rotated in its loosening rotational direction, the filter element also makes the movement of the screw cap away from the remaining filter housing in the manner desired. As a result, this device also facilitates clean removal of the filter element from the filter housing because the filter element is, at the same time, taken along and out of the filter housing when the cap is removed, thus not having to be taken out of the filter housing separately by operating personnel. Again, a small rotary motion, now in the tightening rotational direction of the screw cap, suffices to separate the filter element from the screw cap, whereby the connection means between the filter element and the screw cap are disengaged and the filter element is separated from the screw cap. Thereafter, the used-up filter element can be disposed of and can be replaced by a new filter element. Said new filter element can then be connected to the screw cap via the connection means in a likewise easy manner by a simple rotary motion and can then be inserted in the filter housing jointly with the screw cap and fixed in its position in the filter housing by rotating the screw cap in its tightening rotational direction. Proper functioning of this type of connection means is ensured irrespective of the amount of a possible lateral motional play of the filter element inside the screw cap because, for being engaged and disengaged, the connection means do not require any lateral motion but must only be rotated in relation to each other. This enables this type of connection means to be used to particular advantage in long screw caps which, when a formerly usual locking connection was used, caused problems in undoing said locking connection.

A first preferred further development of the device provides that the angle of rotation covered by the screw cap between the disengaged position and the engaged position of the connection means ranges from approximately 15 degrees to 30 degrees. With such a small angle of rotation, a very small and very quickly and easily executable manual rotary motion of the parts of the device that comprise the connection means in relation to each other suffices for engagement and disengagement.

To also permit use of current filter elements that have already been launched and are already existing on the market in the device according to the invention, a further embodiment of the device proposes that the filter-element-side connection means are formed by a concentric circle of snap-on hooks that is already present at an upper end disk of the filter element and that the associated connection means of the screw cap are formed by a ring with cam segments that is concentrically arranged at the bottom side of the upper part of said screw cap, wherein, in a first rotational position that can be adjusted by rotating in the tightening rotational direction, the circle of snap-on hooks can be moved in axial direction into the ring and out of the ring with the cam segments in relation to each other and wherein, in a second rotational position that can be adjusted by rotating in the loosening rotational direction, the circle of snap-on hooks that has been moved into the ring cannot be moved out of the ring with the cam segments in axial direction in relation to each other. In this embodiment of the device, it is only necessary to modify the inner side of the screw cap; thereafter, the connection between the screw cap on the one hand and the filter element on the other hand can be established and undone in a manner according to the invention. As compared with the formerly usual filter elements, it is not necessary to make any modifications to the filter element, so that conversion to the new type of connection can be achieved with very little technical effort.

To enable the screw cap of the housing to be provided with its connection means in as easy a manner as possible, a further embodiment of the device provides that the ring with the cam segments is inserted in a recess of the screw cap as a separate component such that it can neither be rotated nor lost. This initially permits manufacture of the cap with the region of its recess being formed relatively easily. Subsequently, the ring is installed in this recess, wherein the two parts can be connected to each other by being mutually welded or glued or engaged such that they can neither be rotated nor lost.

A second solution to this problem is provided by the invention by a device of the second aforementioned type, characterized in that the screw cap and the intermediate cap additionally comprise second detachable connection means that can be brought in contact and are used to transmit axial tractive forces, the second connection means can be brought into contact by rotating the screw cap in its loosening rotational direction in relation to the intermediate cap and can be disengaged by rotating the screw cap in its tightening rotational direction in relation to the intermediate cap, and the first connection means can, in relation to the filter element, be brought into contact by rotating the screw cap in its loosening rotational direction, said screw cap taking along the intermediate cap, and can, in relation to the filter element, be disengaged by rotating the intermediate cap in opposite direction.

The contact required for transmission of tractive forces acting in axial direction is, to advantage, established only if it is indeed required, that is during disassembly of the device. This contact is simply generated by rotating the screw cap in its loosening rotational direction, a step that is anyhow required for unscrewing the screw cap from the stationary part of the housing. Both the first and the second connection means are brought into contact by the rotary motion of the screw cap in its loosening rotational direction. Hence, on completion of the procedure of unscrewing the screw cap from the stationary part of the housing, there is contact between the screw cap and the intermediate cap as well as between the intermediate cap and the filter element. This permits the operating personnel to seize only the screw cap that is usually clean on its outside; pulling out does not require that the oily further parts of the device that are removed from the housing be seized. On the contrary, the screw cap, when moving upwards, takes along the centrifuge rotor, the intermediate cap and the filter element in the same upward movement direction. The unit comprising screw cap, centrifuge rotor, intermediate cap and filter element that is removed from the housing can then be separated easily by being rotated in opposite rotational direction in relation to each other, because this rotation that is now effected in opposite direction disengages the connection means between the screw cap and the intermediate cap as well as between the intermediate cap and the filter element. After completion of this disengagement, all parts of the device that have been removed from the stationary housing part, that is the filter element, the intermediate cap, the centrifuge rotor and the screw cap, can be separated from each other. After the filter element and the centrifuge rotor have been replaced by new components, assembly is carried out in reverse order and with opposite rotational directions. Thereafter, a new unit comprising screw cap, centrifuge rotor, intermediate cap and filter element has been pre-assembled, which, as a unit, can be inserted in the lower part of the housing and can be connected to the remaining housing by rotating the screw cap. Rotation of the screw cap in its tightening rotational direction causes the previously established connection contacts to be disengaged, because said connection contacts are neither required when the screw cap is rotated in its tightening rotational direction nor when the screw cap is in its tightened state.

In a further embodiment of the second device according to the invention, it is preferably provided that the angle of rotation covered by the screw cap between the disengaged position and the engaged position of the first and second connection means in relation to the filter element is, altogether, ranging from approximately 45 degrees to 120 degrees. Owing to this angle of rotation that is relatively small despite two connection contacts that must be established and undone, said contacts are swiftly established when the screw cap is rotated in its loosening rotational direction, requiring only a short distance to be covered, and are likewise swiftly undone when the screw cap is rotated in its tightening rotational direction, again requiring only a short distance to be covered. In a more concrete further development of the second device, it is provided that the intermediate cap has the shape of a bell and comprises at its outer perimeter axially extending fins each of which is provided with at least one broadening or aperture pointing in circumferential direction and that the screw cap comprises at its lower edge hooks or noses that are pointing in its loosening rotational direction and can be brought into contact with the broadenings or apertures by rotating the screw cap in its loosening rotational direction in relation to the intermediate cap and can be disengaged by rotating the screw cap in its tightening rotational direction in relation to the intermediate cap. In this embodiment, it is only necessary to form several, for example three, hooks or noses that fit to the screw cap and are distributed over the perimeter thereof and at the lower end edge thereof, this requiring only little additional effort during manufacture of the screw cap. The effort additionally required in the manufacture of the intermediate cap for the formation of the broadenings or apertures as connection means cooperating with the hooks or noses is likewise relatively low, so that the manufacture of the intermediate cap does not require any noticeable additional effort, that would increase the price of the device, either.

A further development of the device provides that the fins that comprise the broadenings or apertures are, at the same time, used as stabilization and force diverting fins for reinforcing the intermediate cap and for diverting onto the screw cap such forces that are caused by an oil pressure below the intermediate cap in the interior region of the housing. As a result, the fins assume two functions, thus minimizing the material and manufacturing expenditures required for achieving as many functions as possible.

To ensure that, with the screw cap unscrewed from the stationary housing part, the intermediate cap that is connected to said screw cap via the connection means that are now in contact and the filter element connected thereto are prevented from falling off and, thus, being damaged in an unintentional manner, it is furthermore preferably provided that the broadenings or apertures on the one hand and/or the hooks or noses on the other hand are each provided with a slope or step at their surfaces that are brought into contact, said slope or step securing the engaged position. As a result, a certain, yet relatively low motional resistance must be overcome for disengaging the connection by rotating the parts in relation to each other, said motional resistance being, however, at any rate great enough to prevent the parts from detaching from each other by themselves in an unintentional manner.

Instead of in the region of the fins at the outer perimeter of the intermediate cap, the second connection means can also be arranged at a different point. To achieve this, a preferred further embodiment provides that the intermediate cap has the shape of a bell and comprises, in a radially outer region of its upper side, several wings that are pointing in an axially upward direction, are spaced apart from each other in circumferential direction and are each provided with at least one broadening or aperture pointing in a circumferential direction or with a depression used as connection means and recessing in a radially inward direction and that the screw cap comprises at is lower edge hooks or noses as connection means that are pointing in the loosening rotational direction of the screw cap or in a radially inward direction, wherein said connection means can be brought into contact with the connection means of the intermediate cap by rotating the screw cap in its loosening rotational direction in relation to the intermediate cap and can be disengaged by rotating the screw cap in its tightening rotational direction in relation to the intermediate cap. This embodiment has a particular advantage in the case of devices with a shorter screw cap that does not extend to the region below the upper part of the screw cap.

In order to prevent the second connections means from positioning in front of each other and jamming in an axial direction when the screw cap is rotated in its tightening rotational direction, it is provided that the second connection means are arranged and designed such that they overlap each other in the axial direction when the screw cap is placed onto the remaining housing before the thread engagement thereof.

To allow easy and quick mounting of the device, it is appropriate that the parts of the device can be joined to form pre-assembled units. To achieve this, it is provided that the wings comprise, at their radially outer end, a guide contour fitting in the interior region of the screw cap with motional play. This guide contour ensures that the intermediate cap, including the centrifuge rotor it is carrying, can be aligned in an exactly axial direction when being inserted in the screw cap, wherein it is ensured that an upper shaft end of a rotor shaft is positioned precisely in a shaft holding in the center of the upper inner side of the screw cap. The filter element can already be attached to the other side of the intermediate cap so that the pre-assembled unit then, to advantage, comprises all of the parts to be installed in the housing and to be connected to the housing.

During operation of the device, a considerable lubricating oil pressure is present below the intermediate cap, whereas the region above the intermediate cap is pressureless relative to ambient atmospheric pressure. In order to absorb the forces caused by the pressure difference and acting on the intermediate cap and to divert said forces into the screw cap, a step at or next to each of the wings is provided, said step projecting in a radially outward direction and forming the basis on which the lower edge of the screw cap is supported when the latter is in the tightened state.

To increase the overall stability and load carrying capacity of the wings and the intermediate cap, it is proposed that the wings be connected to each other via a continuous circumferential collar or be joined to form a continuous circumferential collar.

A further measure to prevent additional manufacturing expenditures and to allow the use of current filter elements, even in the second device according to the invention, comprises filter-element-side connection means that are formed by a concentric circle of snap-on hooks that is already present at an upper end disk of the filter element and further comprises associated connection means of the intermediate cap that are formed by a ring with cam segments that is concentrically arranged at the bottom side of the upper part of said intermediate cap, wherein, in a first rotational position that can be adjusted by rotating in tightening rotational direction, the circle of snap-on hooks can be moved in axial direction into the ring and out of the ring with the cam segments in relation to each other and wherein, in a second rotational position that can be adjusted by rotating in loosening rotational direction, the circle of snap-on hooks that has been moved into the ring cannot be moved out of the ring with the cam segments in axial direction in relation to each other. In this embodiment of the device, use is, to advantage, made of the connection means that are anyhow present at the filter element and that are usually used for engagement of the intermediate cap or for direct engagement of the screw cap where filters without centrifuge are concerned. This prevents a special filter element from having to be made available.

It is furthermore preferably provided that the ring with the cam segments mentioned in the preceding paragraph is inserted in a recess of the intermediate cap such that it can neither be rotated nor lost. In this manner, it is possible to manufacture the ring on the one hand and the intermediate cap on the other hand from different materials, wherein a material with the properties that are particularly suitable for the particular tasks can each be selected. This also simplifies manufacture of the intermediate cap because its bottom side must only be provided with a recess in which the ring will then be inserted. The manufacture of the ring as a separate component is, in particular, simplified if it is manufactured as an injection-molded part because its removing from the mold is not restricted by any parts of the intermediate cap.

To enable the connection means provided at the devices according to the invention as well as the contact of these connection means with each other to be established and undone with as little effort as possible, the connection means are preferably designed in the form of a bayonet lock or as a short-length thread.

For the device, it is furthermore preferably provided that the screw cap, the upper end disk of the filter element as well as the intermediate cap if necessary and, if need be, the ring with the cam segments are each single-piece injection-molded parts of plastic. This permits cost-effective bulk production and results in a low weight of the device.

To further simplify manufacture and mounting of the device, finally, the screw cap including its ring with the cam segments or the intermediate cap including its ring with the cam segments can each be a single-piece injection-molded part of plastic. This is to advantage in that it reduces the number of component parts and the number of mounting steps.

BRIEF DESCRIPTION OF THE DRAWING

Three embodiments of the invention will be illustrated below with reference being made to the enclosed drawings, in which.

DETAILED DESCRIPTION OF THE PREFERRED EMBODIMENT

Figure 1:
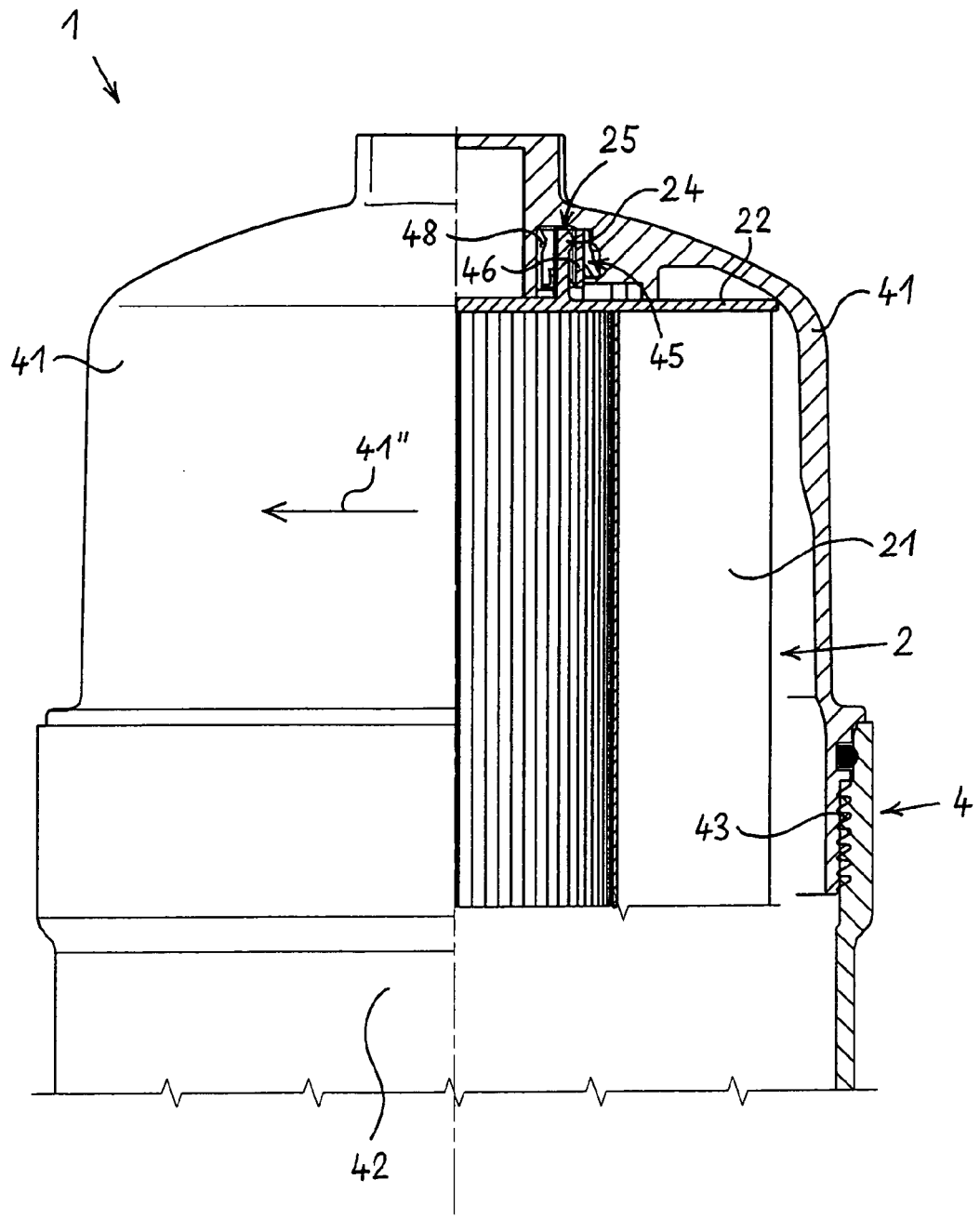
FIG. 1 is a lateral view and partial vertical sectional view of a first device for separating impurities from the lubricating oil of an internal combustion engine, comprising a filter element, in a securely assembled state.

As shown in FIG. 1 of the drawing, the represented first embodiment of a device 1 for separating impurities from the lubricating oil of an internal combustion engine is designed as a pure filter. To this end, the device possesses a housing 4 that comprises a stationary lower housing part 42 and an upper screw cap 41 connected thereto in a detachable manner. In a lower part of the filter housing 4, which is not shown in FIG. 1, ducts, at least for supplying lubricating oil to be purified and for discharging purified lubricating oil, are provided in the usual manner.

The lower housing part 42 and the screw cap 41 can be connected to and separated from each other by means of a screw thread that is rotated. The arrow 41" on the screw cap 41 indicates the tightening rotational direction of said screw cap 41.

In the state of the device 1 shown in FIG. 1, the screw cap 41 is securely screwed to the lower housing part 42 and is sealed by a gasket.

A filter element 2 that has the usual executive form and consists of a filter medium body 21 that is concertina-folded and bent to form a circular hollow cylinder is arranged in the interior region of the housing 4. At each of its two face ends, the filter medium body 21 is connected to an end disk in a sealing manner, wherein only the upper end disk 22 is visible in FIG. 1.

A circle of snap-on hooks 24 that is, in conventional filters for the lubricating oil of an internal combustion engine, used for establishing a locking connection between screw cap and filter element extends from the upper side of the end disk 22 in an upward direction. In the device 1 shown in FIG. 1, use is made of a filter element 2 of a form that is unmodified as compared with a conventional executive form wherein here, however, the function of the anyhow present snap-on hooks 24 is a different one.

Here, the snap-on hooks 24 of the upper end disk 22 of the filter element 2 form connection means 25 which can, optionally, be engaged and disengaged by means of connection means 45. The connection means 45 are arranged at the inner side of the screw cap 41 and radially at the immediate outside of the connection means 25 such that they fit to the latter.

Here, the connection means 45 are formed by a ring 46 with cam segments, said ring 46 being arranged concentrically about the longitudinal central axis of the screw cap 41 and being connected to the remaining screw cap 41 such that it can neither be rotated nor lost. In the state shown in FIG. 1, the cams of the cam segments of the ring 46 are positioned such that they are each positioned between two neighboring snap-on hooks 24 of the end disk 22. Thus, the connection means 25, 45 are, here, disengaged.

At the same time, the screw cap 41, when in the tightened position shown in FIG. 1, ensures that the filter element 2 assumes a fixed position inside the housing 4 by the screw cap 41 entering in abutment against the upper side of the upper end disk 22 of the filter element 2.

Figure 2:
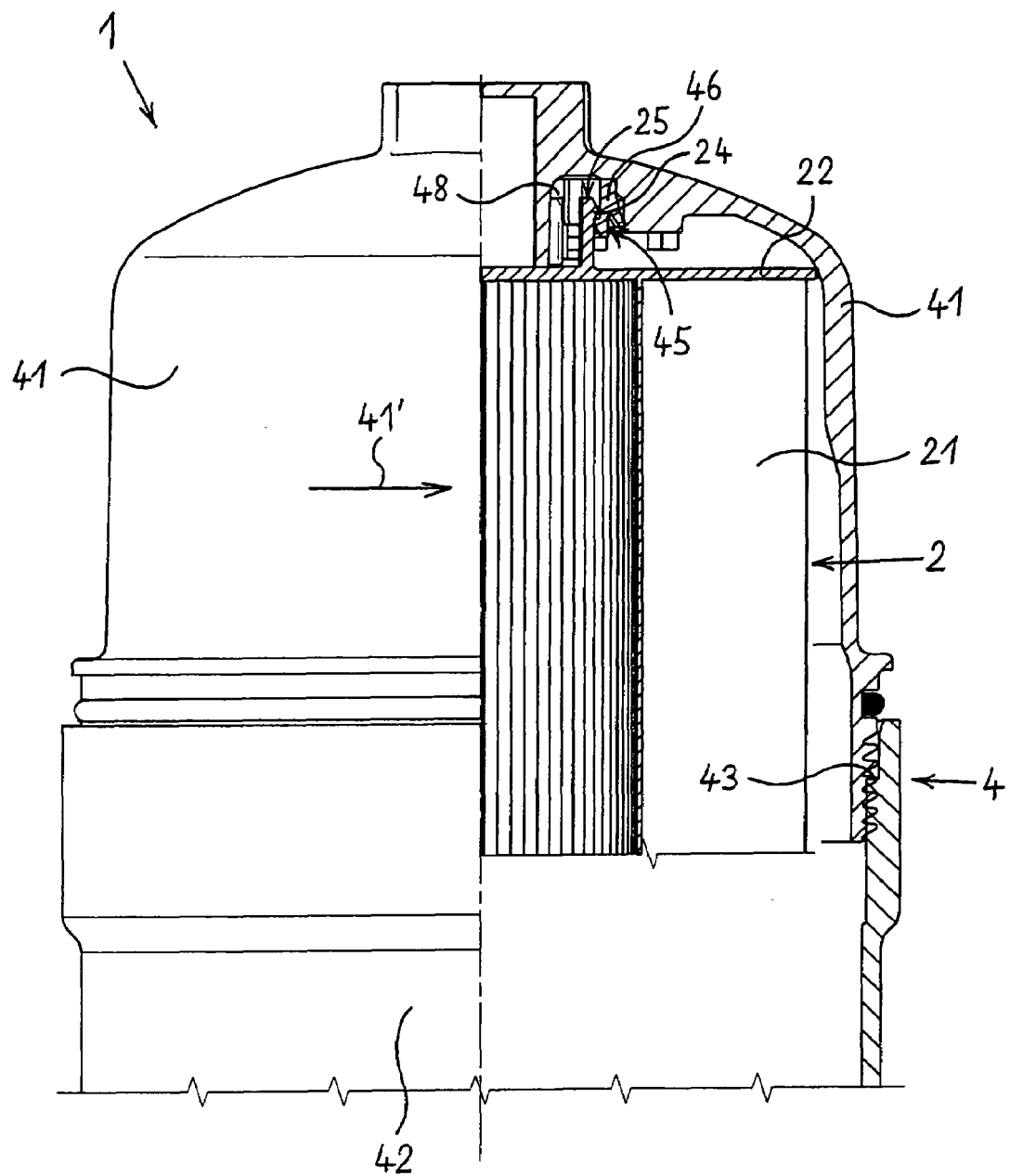
FIG. 2 is a view of the device of FIG. 1 in a state where a screw cap of the device is being rotated in its loosening rotational direction, in the same type of representation as in FIG. 1.

This state of the screw cap 41 is present during normal operation of the device 1. FIG. 2 of the drawing shows the device 1 of FIG. 1 in the same view, however, now in a second operating state where the screw cap 41 is rotated in its loosening rotational direction. The arrow 41' indicates the loosening rotational direction of the screw cap 41.

By being rotated in its loosening rotational direction, the screw cap 41 is rotated not only in relation to the stationary housing part 42 of the housing 4 but, in the same sense, also in relation to the filter element 2. In the conventional embodiment, the filter element 2 comprises, at its lower end, a central aperture in its lower end disk, said aperture being positioned on a connection piece by means of an axial and/or radial seal. Although the filter element 2 can be rotated on this connection piece, this is possible only if a certain frictional force inevitably developing between the lower end disk of the filter element 2 and the connection piece is overcome.

After the screw cap 41 has covered a small rotational angle of, for example, approximately 15 degrees to 30 degrees in its loosening rotational direction, the cam segments present at the ring 46 enter a position opposite to the snap-on hooks 24. Once the cam segments of the ring 46 and the snap-on hooks 24 are positioned opposite to each other, it is no longer possible to further rotate the screw cap 41 and the filter element 2 in relation to each other in the same directional sense because this is prevented by stops provided in the ring 46. Thus, the connection means 25, 45 are now engaging each other. Since the screw cap 41 and the filter element 2 can no longer be rotated further in the same directional sense and in relation to each other beyond the measure achieved, the filter element 2, while the screw cap 41 is further rotated in its loosening rotational direction, is also further rotated synchronously with the screw cap 41, wherein the connection means 25, 45 are still engaging each other.

The connection means 25, 45 are able to transmit an appropriate axial tractive force from the screw cap 41 to the filter element 2, so that the latter, while overcoming the friction on its connection piece, is moved upwards together with the screw cap 41 when the latter is rotated in its loosening rotational direction, thus being finally moved out of the filter housing 4.

In order to subsequently separate the filter element 2 from the screw cap 41, it suffices to shortly rotate the screw cap 41 in its tightening rotational direction in relation to the filter element 2. This rotation causes the connection means 25, 45 to be disengaged, so that the filter element 2 can be pulled out of the screw cap 41 in axial direction without a tractive force having to be applied and without a canting motion having to be made for disengagement.

Thereafter, a new filter element 2, including its connection means 25, can first be introduced in the screw cap 41 in axial direction and can then, by shortly rotating the screw cap 41 in its loosening rotational direction in relation to the filter element 2, be connected to the latter, thus causing the connection means 25, 45 to be brought into contact. In this state, the screw cap 41 can be seized and, jointly with the filter element 2, be moved to the lower stationary housing part 42 and can then be reconnected to the latter by a rotary motion.

Although the connection means 25, 45 between the screw cap 41 and the filter element 2 disengage when the screw cap 41 is rotated in its tightening rotational direction, this is of no relevance here, because now the filter element 2 is already positioned on its connection piece with its lower end. The thrust force required for further pushing the filter element 2 onto the connection piece is transmitted by the screw cap 41 onto the upper side of the upper end disk 22 where there is an immediate abutment of these two parts against each other.

Figure 3:
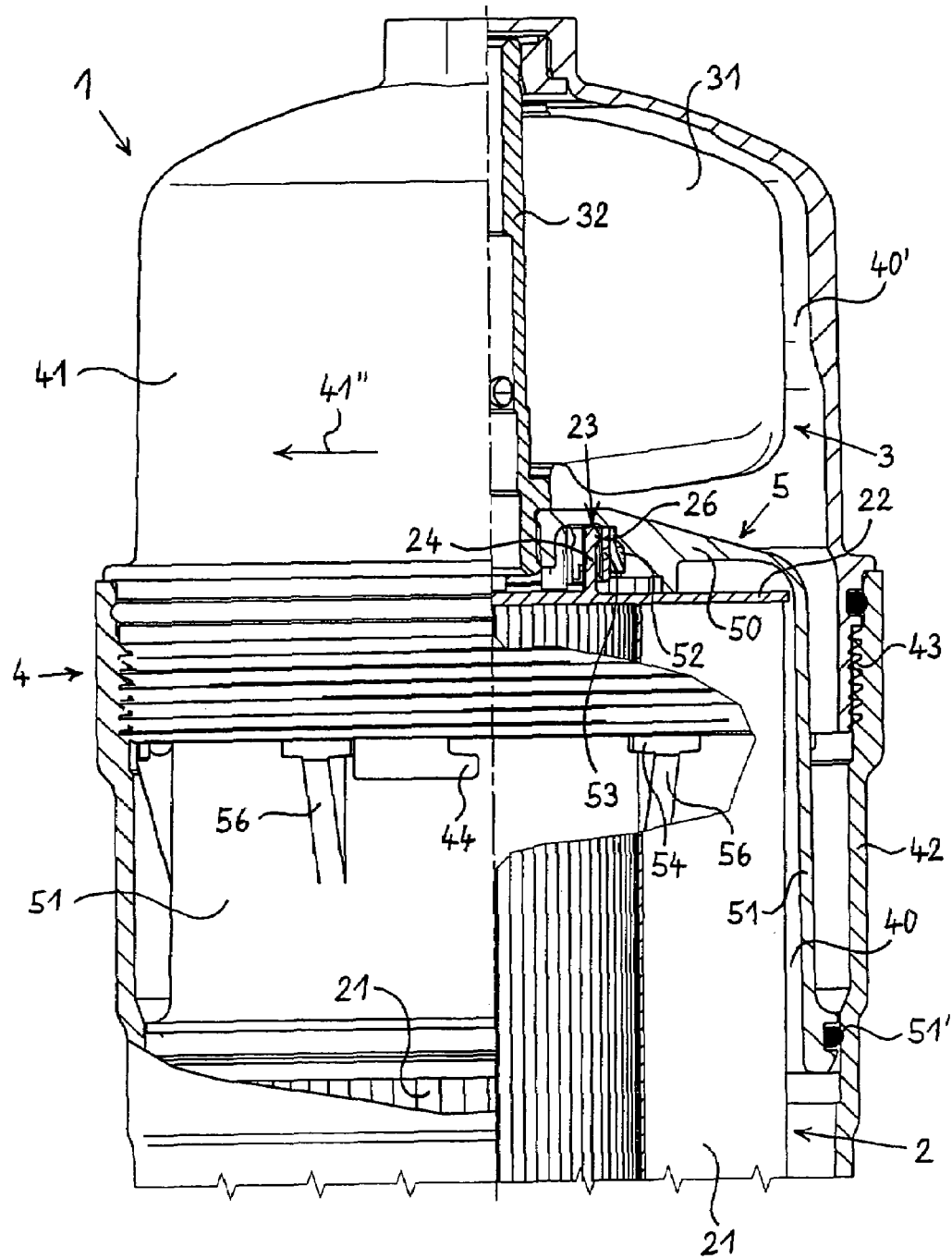
FIG. 3 is a lateral view, a partial vertical sectional view and a partially broken view of a second device for separating impurities from the lubricating oil of an internal combustion engine comprising a filter element and a centrifuge, in a securely assembled state.

As shown in FIG. 3 of the drawing, the represented second embodiment of the device 1 for separating impurities from the lubricating oil of an internal combustion engine also comprises a housing 4, which is formed by a lower stationary housing part 42 and an upper screw cap 41. The screw cap 41 can be screwed into the stationary housing part 42 by means of the threaded connection 43 that is sealed by a gasket, wherein the screw cap 41 is shown in FIG. 1 in its securely tightened state.

A filter element 2 in the form of a filter medium body 21 with an upper end disk 22 and a lower end disk that is not visible here is arranged in the lower part of the housing 4. A centrifuge 3 comprising a rotor 31 that is pivoted on a rotational axis 32 is provided in the upper part of the housing 4 flush with and above the filter element 2.

The interior region of the housing 4 is subdivided in a lower region 40 and an upper region 40' by a bell-shaped intermediate cap 5. The intermediate cap 5 comprises an upper part 50 that is arranged above the filter element 2 and below the rotor 31 of the centrifuge 3. A circumferential wall 51 extends down from the outer edge of the upper part 50 of the intermediate cap 5. At its lower end, said circumferential wall 51 is inserted in the stationary housing 42 in a sealing manner by means of a gasket 51'. During operation of the device 1, the pressure present below the intermediate cap 5 is the operating oil pressure; above the intermediate cap 5, there is a pressure-less region 40' for draining the oil exiting out of the centrifuge rotor 31, wherein the region 40' is usually connected to an oil pan of the associated internal combustion engine.

The lower end of the rotor axis 32 is held centrally in the upper side of the upper part 50 of the intermediate cap 5. The upper end of the rotor axis 32 is mounted centrally in the upper end region of the inner side of the screw cap 41.

Connection means 23, 53 that can optionally be engaged with and disengaged from each other are arranged between the upper end disk 22 and the intermediate cap 5. The connection means provided at the end disk 22 are formed by a circle 23 of snap-hooks that is formed by several hooks 24 that are projecting upwards, are spaced apart from each other and are each comprising a nose 26 pointing in radially outward direction. A ring 53 that is provided as intermediate-cap-side connection means is arranged in a radial direction outside of this circle 23 of snap-on hooks, wherein the ring 53 is provided with cam segments enabling optional engagement with or disengagement from the circle 23 of snap-on hooks. In the present executive example, the ring 53 with the cam segments is inserted as a separate component in a suitable recess 52 of the intermediate cap 5 from below and is held in the aperture 52 such that it can neither be rotated nor lost.

Second connection means are provided between the lower end of the screw cap 41 and the outer perimeter of the intermediate cap 5. On the side of the screw cap 41, the connection means are formed by hooks 44 that are pointing in circumferential direction and in the loosening rotational direction of said screw cap 41 and are formed to fit to the lower edge of the screw cap 41. On the side of the intermediate cap 5, fins 56 having broadenings 54 at their upper end and extending in axial direction are formed to fit to the outer side of the circumferential wall 51 of said intermediate cap 5. Therein, the broadenings 54 and the hooks 44 form the connection means which optionally engage with or disengage from each other, depending on the rotational state.

FIG. 3 shows the device 1 in a state where the screw cap is securely screwed to the stationary part 42 of the housing 4. This position is achieved by rotating the screw cap 41 in its tightening rotational direction 41". In this position, both the first connection means 23, 53 and the second connection means 44, 54 are disengaged, because these parts have been rotated in relation to each other when the screw cap 41 was rotated in its tightening rotational direction such that the engagement of the mentioned connection means is undone. In this state, the connection means 23, 53 and 44, 54 are not able to transmit any forces in axial direction, this not being necessary when the device 1 is in the assembled state.

Figure 4:
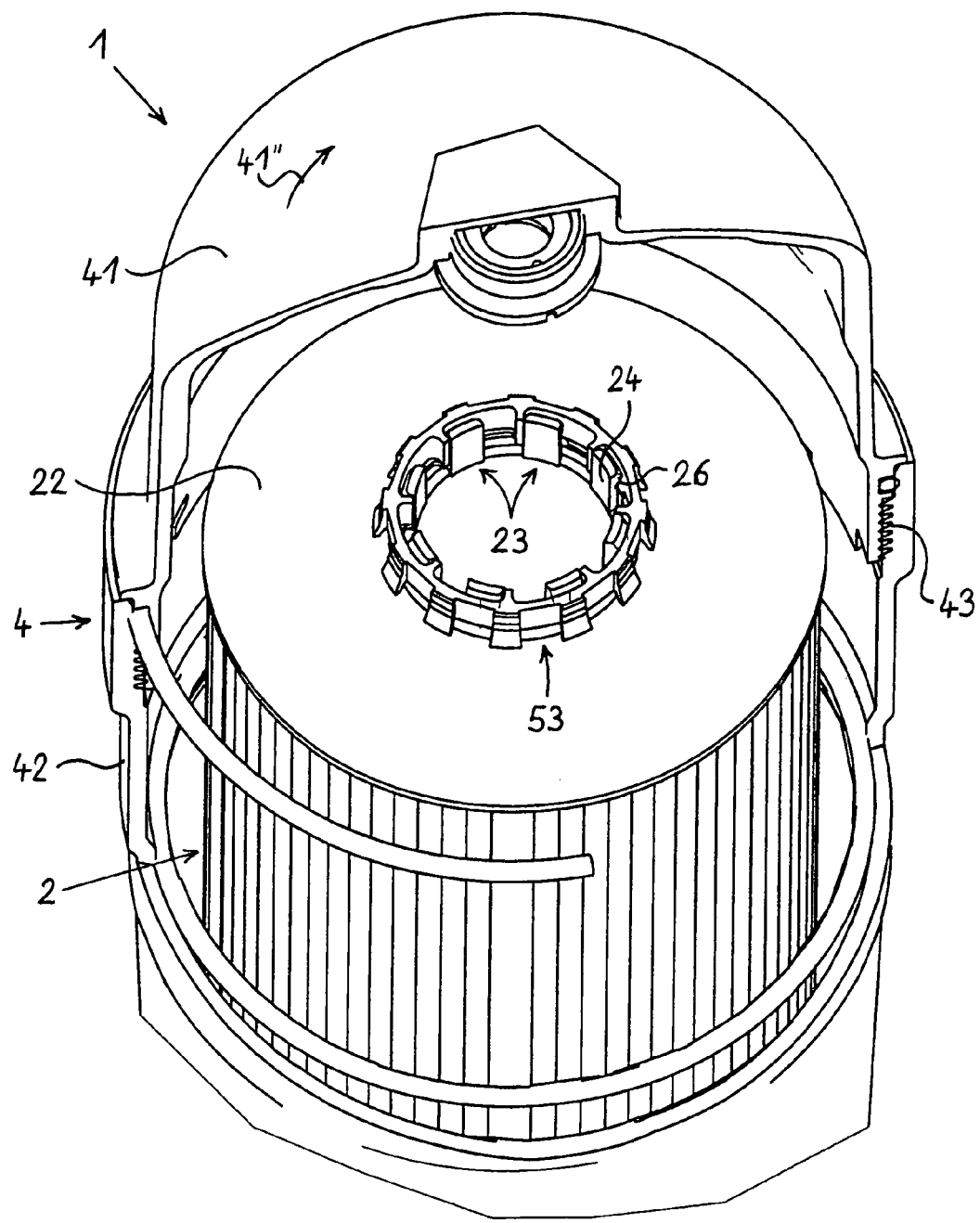
FIG. 4 is an oblique top view of the device of FIG. 3 in partially open representation and with individual parts of the device having been omitted.

In FIG. 4, the device 1 shown in FIG. 3 is represented in perspective in an oblique top view, with some parts of the device 1 having been omitted. Here, particularly the centrifuge 3 has been omitted for reasons of clarity. Of the intermediate cap 5, FIG. 2 only shows the ring 53 forming the connection means. In the center of FIG. 2, the filter element 2 can be seen with its upper end disk 22 from the upper side of which the circle 23 of snap-on hooks projects with the individual hooks 24 that are each provided with a nose 26 pointing in an outward direction. The ring 53 that forms a part of the intermediate cap 5 that is not represented cooperates with said circle 23 of snap-on hooks. In the rotational position visible in FIG. 2, which corresponds to the rotational position according to FIG. 1, the circle 23 of snap-on hooks do not engage the ring 53 so that, in this state, axial forces cannot be transmitted between these two parts. Here, the screw connection 43 between the screw cap 41 and the stationary part 42 of the housing 4 is completely tightened in the tightening rotational direction 41" according to the state shown in FIG. 1.

Figure 5:
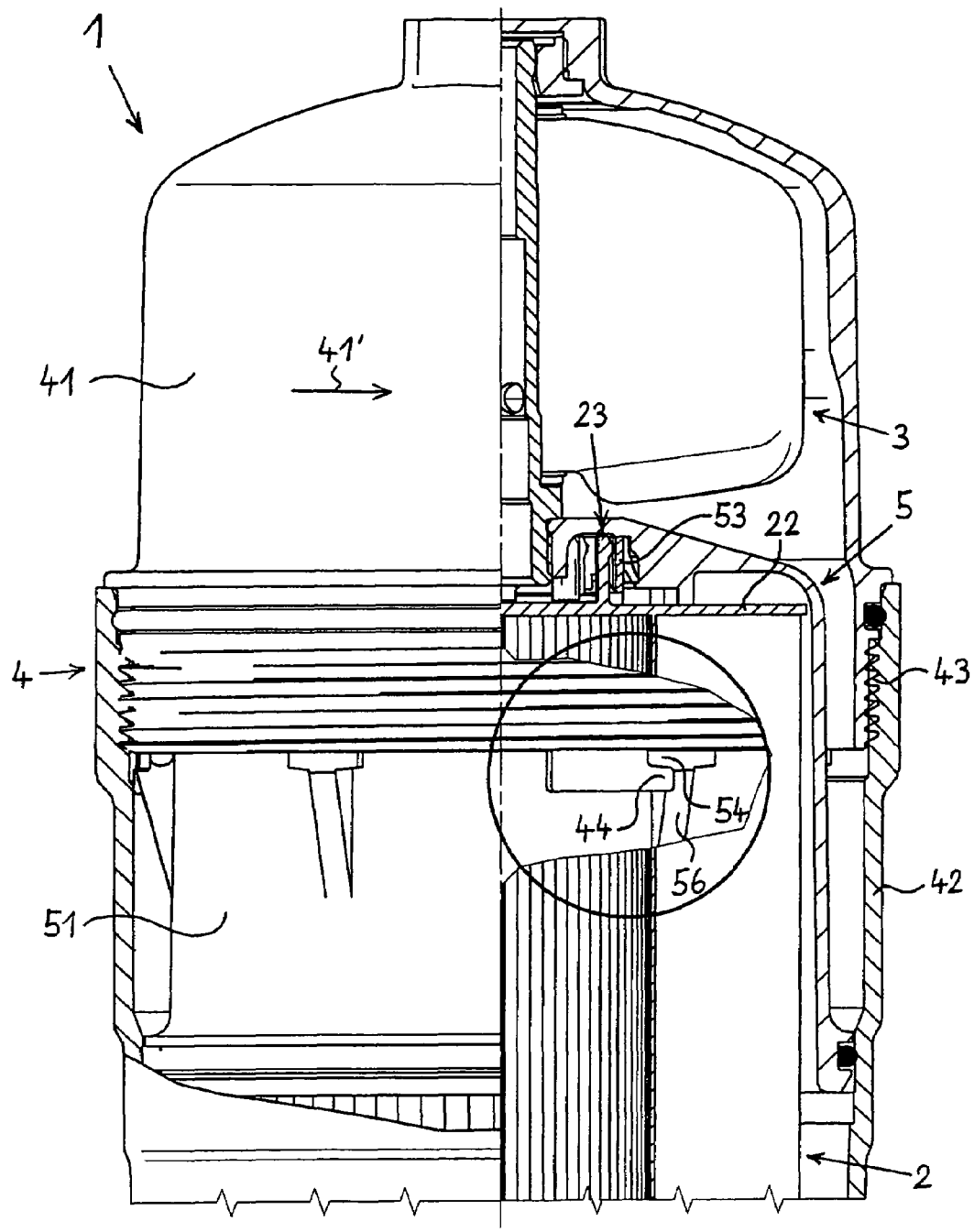
FIG. 5 is a view of the device of FIG. 3 in the same type of representation as in FIG. 3, however, now with the screw cap being in a first rotational position at the start of being rotated in its loosening rotational direction on opening of the device.

In a view corresponding to that shown in FIG. 3, FIG. 5 of the drawing shows the device 1 after the screw cap 41 has been rotated in its loosening rotational direction by approximately 45 degrees. By this rotation of the screw cap 41, the latter's hooks 44 are brought into contact with the broadenings 54, as can be seen from the detail encircled in FIG. 5.

Until the angle of rotation shown here is reached, only the screw cap 41' is moved; the intermediate cap 5 has, here, not yet been rotated. For that reason, the connection means 23 of the end disk 22 of the filter element 2 and the connection 53 in the form of the ring at the intermediate cap 5 are still disengaged.

In the detail encircled in FIG. 5, the surfaces of the connection means 44, 54 that are brought into contact with each other are designed in the form of straight lines. In order to avoid that, here, the engagement can be undone too easily and, thus, automatically in an undesired manner, a modification according to FIG. 5a can be provided. In this modification according to FIG. 5a, the surfaces or regions of the connection means 44, 54 that are brought into contact with each other are each provided with a step 47, 57. These steps 47, 57 ensure that the engagement is prevented from being easily and automatically undone when a tractive force is applied in axial direction.

Figure 5A:
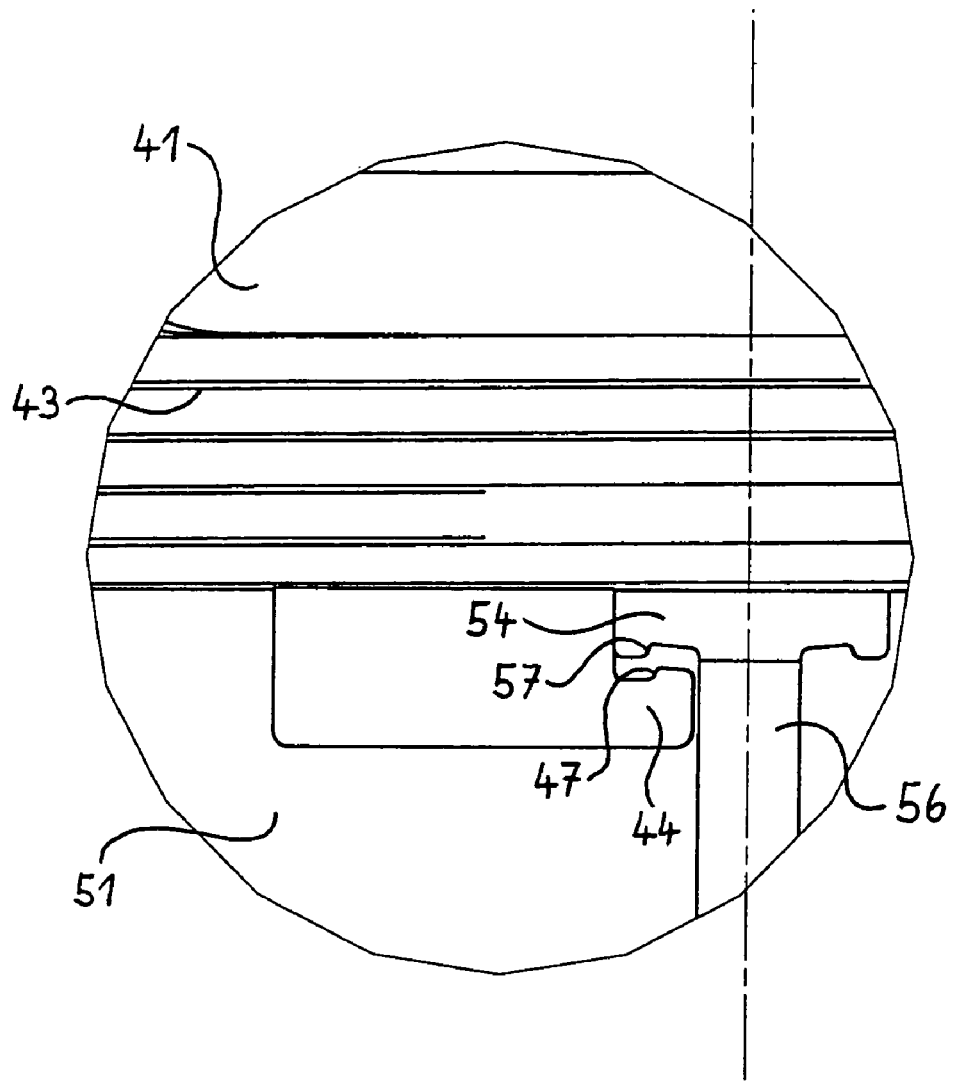
FIG. 5a is a view of the detail encircled in FIG. 5, in a modified embodiment.
Figure 6:
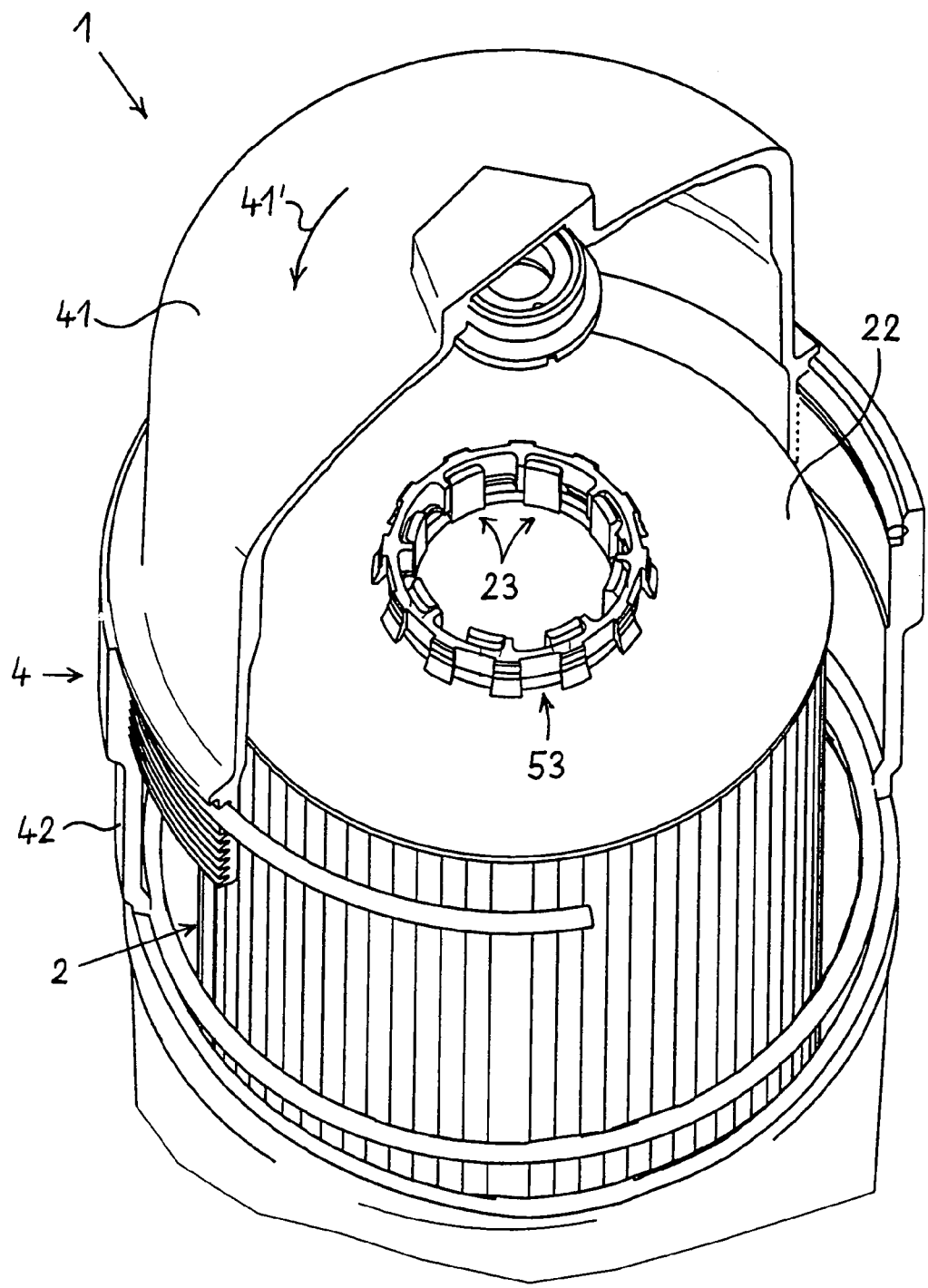
FIG. 6 is a view of the device of FIG. 5 in the same type of representation as in FIG. 3 and in the same rotational state as in FIG. 3.

A small part of the screw cap 41 with its thread 43 is, in addition, visible in the upper part of FIG. 5a. A section of one of the fins 56 on the outer side of the circumferential wall 51 of the intermediate cap 5 is visible to the right bottom of FIG. 5a. FIG. 6 shows the device 1 with the screw cap 41 being in the rotational state already shown in FIG. 5, in perspective and in an oblique top view in the same type of representation as in FIG. 4. FIG. 6 illustrates that the screw cap 41 has now been rotated in its loosening rotational direction 41' by approximately 45 degrees, as compared with its position shown in FIG. 4. This rotation only involves the screw cap 41 because the latter's rotation has not yet been transmitted to the intermediate cap 5. For that reason, the connection means 23 of the upper end disk 22 of the filter element 2 and the connection means 53 forming a part of the intermediate cap 5 that is not shown in FIG. 4 are still disengaged.

Figure 7:
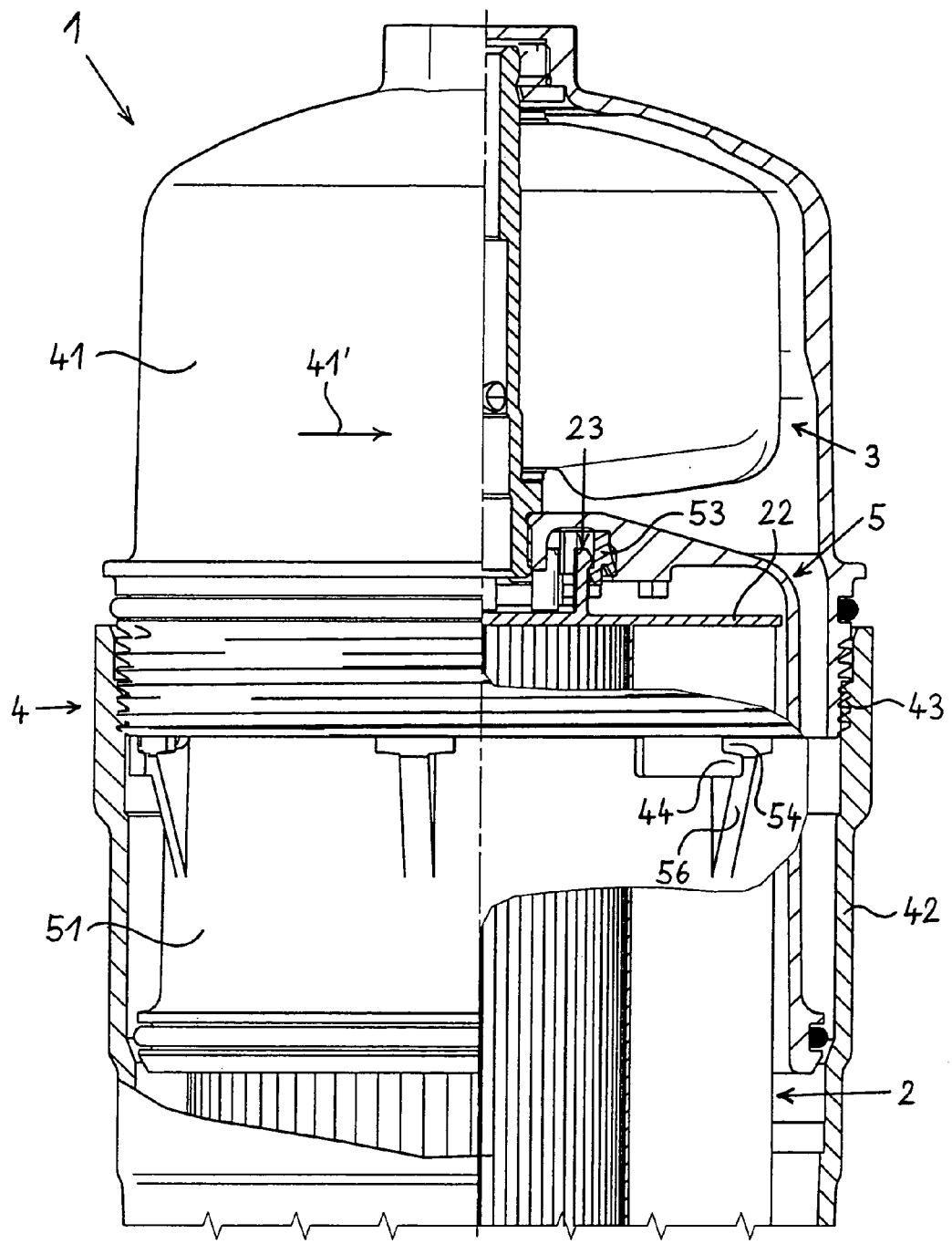
FIG. 7 is a view of the device of FIG. 3 with the screw cap being in a rotational state where it has been further rotated in its loosening rotational direction, in the same type of representation as in FIG. 3 and in FIG. 5.

FIG. 7 shows the device 1 in a state where the screw cap 41 is still further rotated in its loosening rotational direction 41'. Since it has been further rotated in this manner, the screw cap 41 takes along the intermediate cap 5 in its loosening rotational direction, because the hooks 44 run against the broadenings 54. As a result, the intermediate cap 5 now rotates in relation to the filter element 2 such that the connection means 23 of the filter element 2 and the connection means 53 of the intermediate cap 5 are now brought into contact, as it is visible at the connection means 23, 53 above the upper end disk 22. In this state, the first connection means 23, 53 between the intermediate cap 5 and the filter element 2 as well as the second connection means 44, 54 between the screw cap 41 and the intermediate cap 5 are, thus, in engagement. This state now remains as such, even if the screw cap 41 is further rotated in its loosening rotational direction 41'. When it is further rotated, the screw cap 41 is detached from the stationary part 42 of the housing 4. Since the connection means 23, 53 and 44, 54 are in engagement, the screw cap 41 takes along the centrifuge 3, the intermediate cap 5 and the filter element 2 in upward direction. Therein, the intermediate cap 5 can be easily be pulled out of the stationary housing part 42 even against a vacuum.

Thereafter, the filter element 2 can be separated from the intermediate cap 5 simply by shortly rotating the two parts in relation to each other in a rotational direction opposite to the previous rotational direction, whereby undoing of the engagement of the connection means 23, 53 and pulling the filter element 2 out of the intermediate cap 5 in an axially downward direction can be achieved without any special effort being required. This is to particular advantage in devices 1 where the intermediate cap 5 covers the filter element 2 across a major part of the latter's height, because the usual canting required to achieve disengagement would not be possible here.

A likewise short rotation in a direction opposite to the previous rotational direction is sufficient to separate the intermediate cap 5 from the screw cap 41, causing the connection means 44, 54 to disengage. In this manner, it is possible to remove the screw cap 41 from the intermediate cap 5 in axial direction. As a result, the centrifuge becomes, at the same time, accessible for a replacement of the centrifuge rotor 31 if this becomes necessary.

The individual parts of the device 1 are assembled in reverse order and with opposite rotational directions. Thereafter, a joined unit comprising screw cap 41, centrifuge 3, intermediate cap 5 and filter element 2 can jointly be connected to the stationary part 42 of the housing 4 by rotating the screw cap 41 in the tightening rotational direction thereof.

Figure 8:
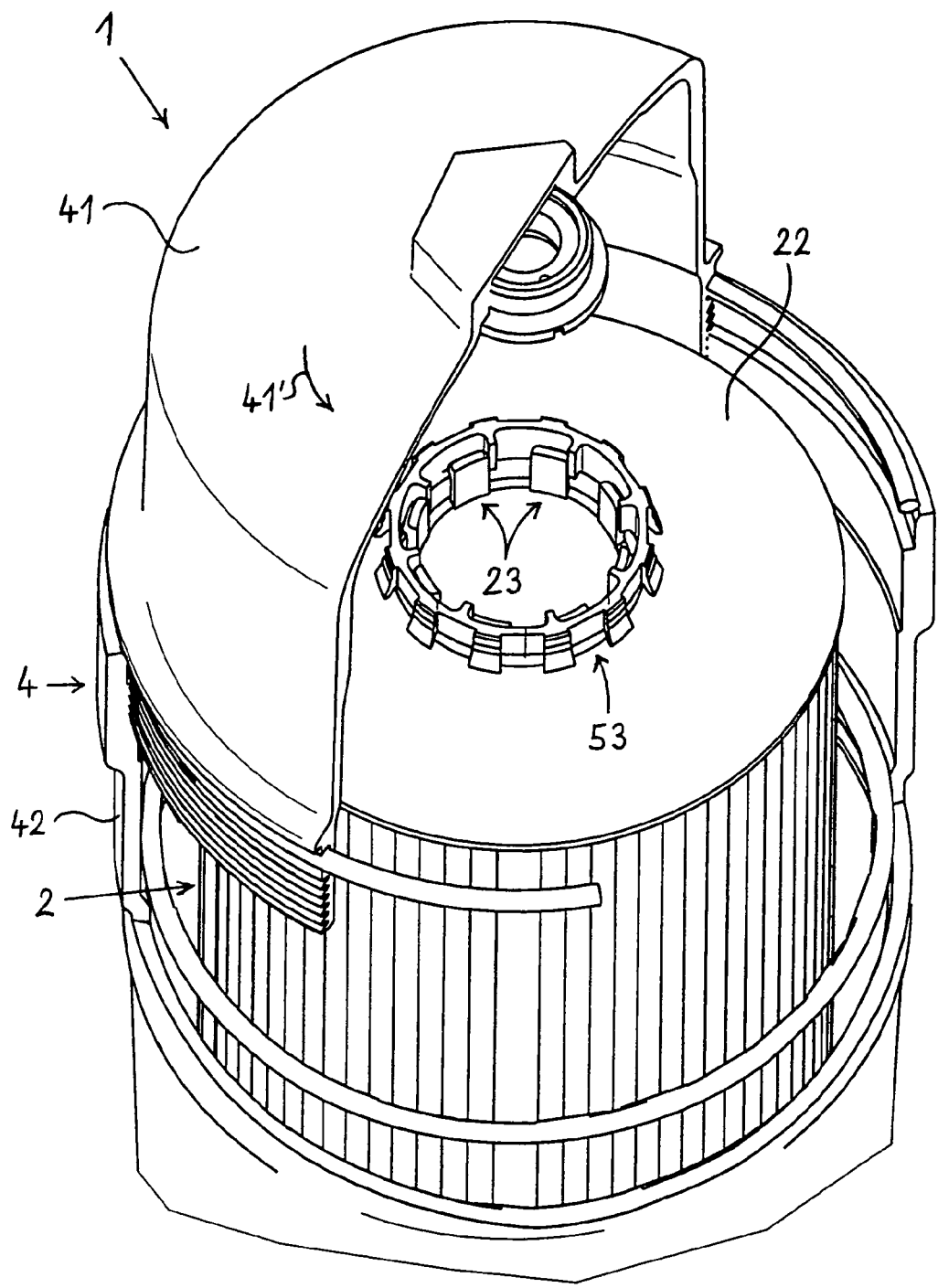
FIG. 8 is a view of the device of FIG. 7 in the same type of representation as in FIGS. 4 and 6 in the rotational state according to FIG. 7.

FIG. 8 shows the device 1 in the state according to FIG. 7, however, now in perspective and in an oblique top view with individual parts having been omitted and in a partially open view. This figure illustrates that, now, the screw cap 41 has been rotated still further in its loosening rotational direction.

As already described by means of FIG. 7, this causes the intermediate cap 5 that is not shown in FIG. 8 to be also rotated together with the ring 53 with the cam segments that is attached thereto such that it cannot be rotated. Therein, the ring 53 is rotated in relation to the filter element 2 and to the circle 23 of snap-on hooks that are arranged on the upper end disk 22 of said filter element 2. In this position, the connection means 23, 53 are in engagement so that an axial tractive force can be transmitted from the intermediate cap 5 to the filter element 2 via the connection means 23, 53.

FIGS. 9 through 12 show a third embodiment of a device 1, which also comprises a centrifuge 3 and a filter element 2 inside a common housing 4.

Figure 9:
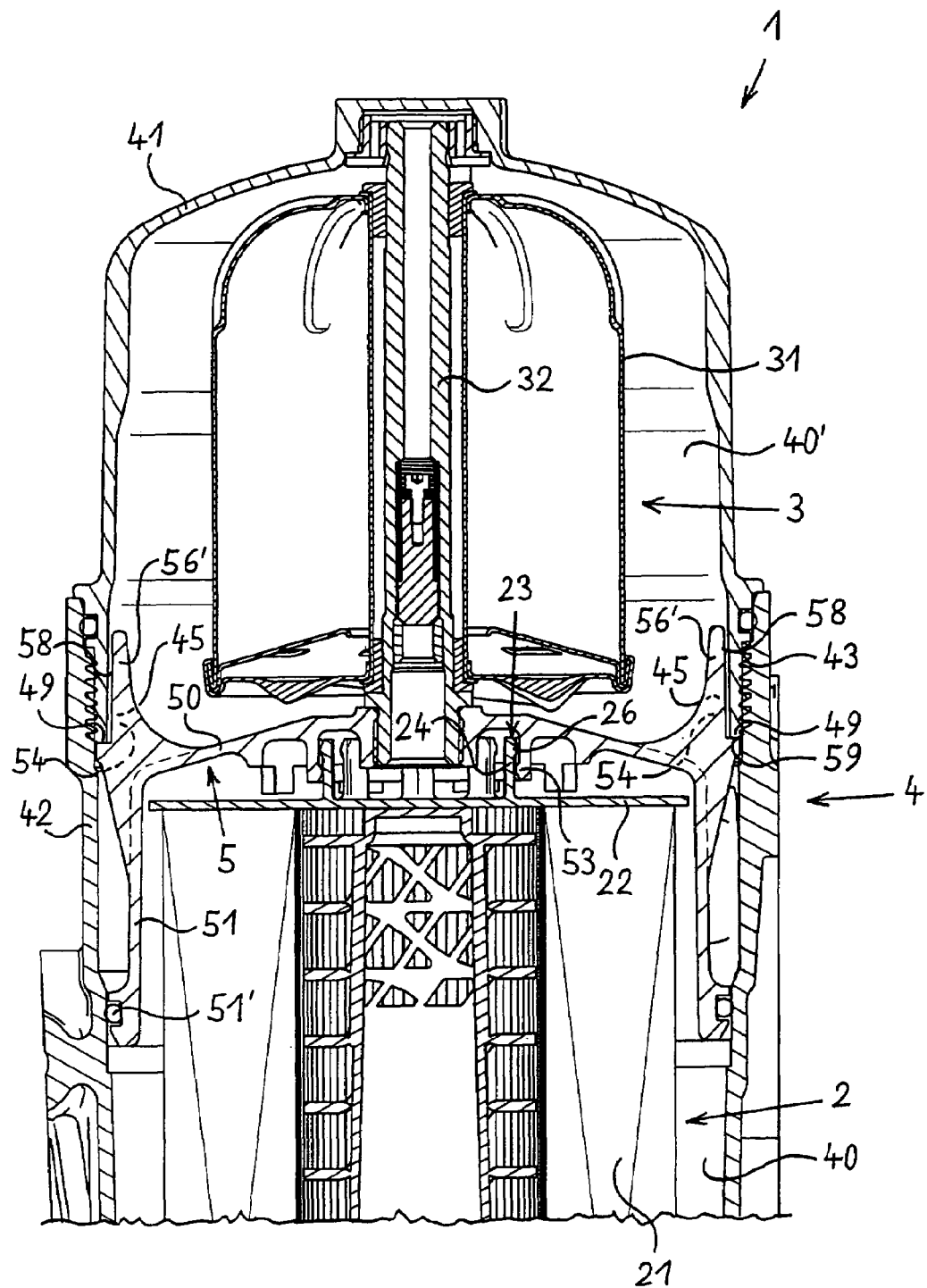
FIG. 9 is a vertical sectional view of a third device for separating impurities from the lubricating oil of an internal combustion engine comprising a filter element and a centrifuge, in a securely assembled state.

The longitudinal section according to FIG. 9 shows this arrangement in the housing 4, with the centrifuge 3 at the top and the filter element 2 at the bottom. Here as well, the housing 4 is provided with a stationary lower housing part 42 and a screw cap 41 that is connected thereto via a thread 43 and can be rotated in its loosening rotational direction. The intermediate cap 5 subdivides the interior region of the housing 4 in a lower housing region 40 that accepts the filter element 2 and an upper housing part 40' that accepts the centrifuge 3. Here as well, the intermediate cap 5 has the approximate shape of a bell and possesses a curved upper part 50 as well as a circumferential region 51 arranged adjacent thereto in downward direction. At the bottom of this circumferential region 51, a gasket 51' is inserted in a groove that points in a radially outward direction, thus causing the intermediate cap 5 to be positioned in the lower part 42 of the housing 4 in a sealing manner.

Connection means 53 that are brought into contact with the connection means 23 at the upper side of the upper end disk 22 of the filter element 2 are arranged at the bottom side of the upper part 50 of the intermediate cap 5. These connection means 23, 53 permit axial tractive forces from the intermediate cap 5 to be applied to the filter element 2 with its filter medium body 21. Here, the connection means 23 on the side of the filter element 2 are formed by a circle of locking hooks 24 with locking noses 26. The connection can, here, be designed as a locking connection or as a rotary connection.

The centrifuge 3 comprises a centrifuge rotor 31 that is pivoted on a rotor axis 32. With its lower end, this rotor axis 32 is seated in an appropriate recess in the upper side of the intermediate cap 5. With its upper end, the rotor axis 32 is seated in an appropriate central recess at the inner side of the screw cap 41.

Furthermore, connection means 45, 54 that can optionally be engaged and disengaged by rotating the screw cap 41 are provided between the screw cap 41 and the intermediate cap 5 in this embodiment of the device 1 as well. In the state of the device 1 shown in FIG. 9, where the screw cap 41 is completely and securely tightened, the connection means 45, 54 are disengaged.

During operation of the device 1, lubricating oil to be purified flows through an inlet that is not visible, first into the lower housing region 40 and, from there, from without inward in a radial direction through the filter medium body 21. A part of this lubricating oil that has flown through this filter medium body 21 flows up and into the centrifuge 3 and, after having left the centrifuge rotor 31, from there into the upper housing region 40'. This housing region 40' is pressureless and connected to the oil pan of an associated internal combustion engine via a return line that is not shown here.

Contrary to the upper housing region 40', the full oil pressure is present in the housing region 40 below the screw cap 5. In order to absorb and divert the force that is generated by this pressure difference and acts on the intermediate cap 5 in an axially upward direction, the intermediate cap 5 comprises outwardly projecting steps 59 in a radially outward region at its upper part 50. When it is in its tightened state, the screw 41 rests on said steps 59 with its bottom edge 49. As a result, the intermediate cap 5 is secured in its position and can absorb the force caused by the pressure difference and divert it to the housing 4 of the device 1 without any difficulties.

A method that is as efficient as possible is aimed at for mounting of the device 1. The device 1 according to FIG. 9 provides the possibility of being pre-assembled to a considerable extent. To achieve this, the filter element 2 is first brought into contact with the connection means 53 at the intermediate cap 5 via its own connection means 23. Thereafter, the rotor shaft 32, including the centrifuge rotor 31 arranged on top of it, can be inserted in the intermediate cap 5 from above. Subsequently, this pre-assembled unit comprising filter element 2, intermediate cap 5 and centrifuge 3 is introduced into the screw cap 41 from below until the upper end of the rotor axis 32 is seated appropriately in the associated recess on the inner side of the cap 41. This pre-assembled unit that now also comprises the screw cap 4 can then be connected to the stationary housing part 40 of the device 1 by rotating the screw cap 41 in the tightening rotational direction thereof.

In order to avoid difficulties during introduction of the upper end of the rotor axis 32 into the associated recess in the cover 41 and to accommodate the above-mentioned connection means 45, 54 between the screw cap 41 and the intermediate cap 5, the intermediate cap 5 is, here, equipped with several outwardly and upwardly extending wings 56' in the radially outer region of its upper part 50. The wings 56' are distributed over the intermediate cap 5 in circumferential direction and at uniform intervals, wherein a total of four wings 56' are, here, provided at intervals of 90 degrees each.

At its radially outer end, each wing 56' possesses a guide contour 59 that is extending in axial direction and fits in the interior region of the lower part of the screw cap 41 with a little motional play. This guide contour 58 ensures that there will be no cantings when the intermediate cap 5 and the screw cap 41 are joined together. On the contrary, the joining together is inevitably effected at an exactly axial orientation, this being ensured by the guide contour 58. At the same time, this ensures that the upper end of the rotor axis 32 always accurately enters in the associated recess on the inner side of the screw cap 41.

Figure 10:
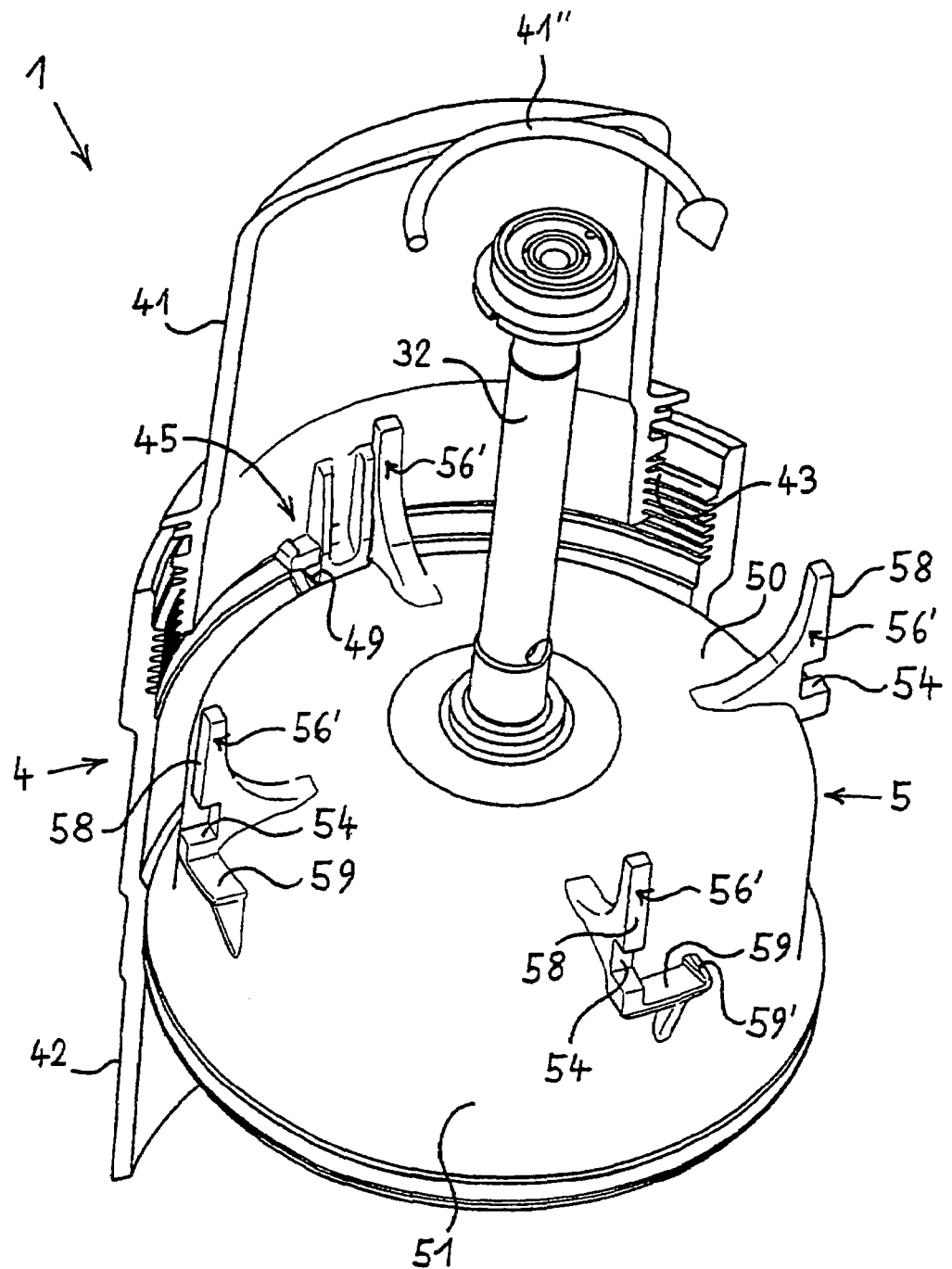
FIG. 10 is a partially broken perspective view of the device of FIG. 9, with the centrifuge rotor and the filter element having been omitted, with tightened screw cap.

FIG. 10 shows the device 1 of FIG. 9 in perspective in an open view, wherein, here, the filter element and the centrifuge rotor have been omitted for reasons of clarity.

Here, the cap 41 of the housing 4 is in its fully tightened position. The tightening rotational direction of the screw cap 41 is indicated by the rotary arrow 41".

FIG. 10 shows the arrangement and distribution of the wings 56' on the intermediate cap 5 particularly clearly. At its radially outer end, each wing 56' possesses the guide contour 58 that has already been described above and that extends in axial direction of the screw cap 41. Moreover, each wing 56' possesses a rectangular aperture that is open in radially outward direction and that forms the connection means 54 to engage the connection means 45 at the screw cap 41.

In FIG. 10, the screw cap 41 is fully tightened, as mentioned above. In this rotational position of the screw cap 41, the connection means 45, 54 are disengaged. Here, the connection means 45 at the screw cap 41 only abut against the wings 56' as seen in circumferential direction, wherein a rotary motion, but not an axial tractive force, can be transmitted from the screw cap 41 to the intermediate cap 5 in tightening rotational direction.

Next to each wing 56', a step 59 projecting in outward direction is formed to fit to the intermediate cap 5. These steps 59 are used to divert axial forces that are caused by the pressure difference between the bottom side and the upper side of the intermediate cap 5. When the screw cap 41 is in the tightened state, its lower edge 49 that is positioned in the region of the connection means 45 rests on these steps 59. As a result, the developing forces that are acting in an axially upward direction are widely diverted onto the screw cap 41 and, via the thread 43, to the remaining part of the housing 4.

Figure 11:
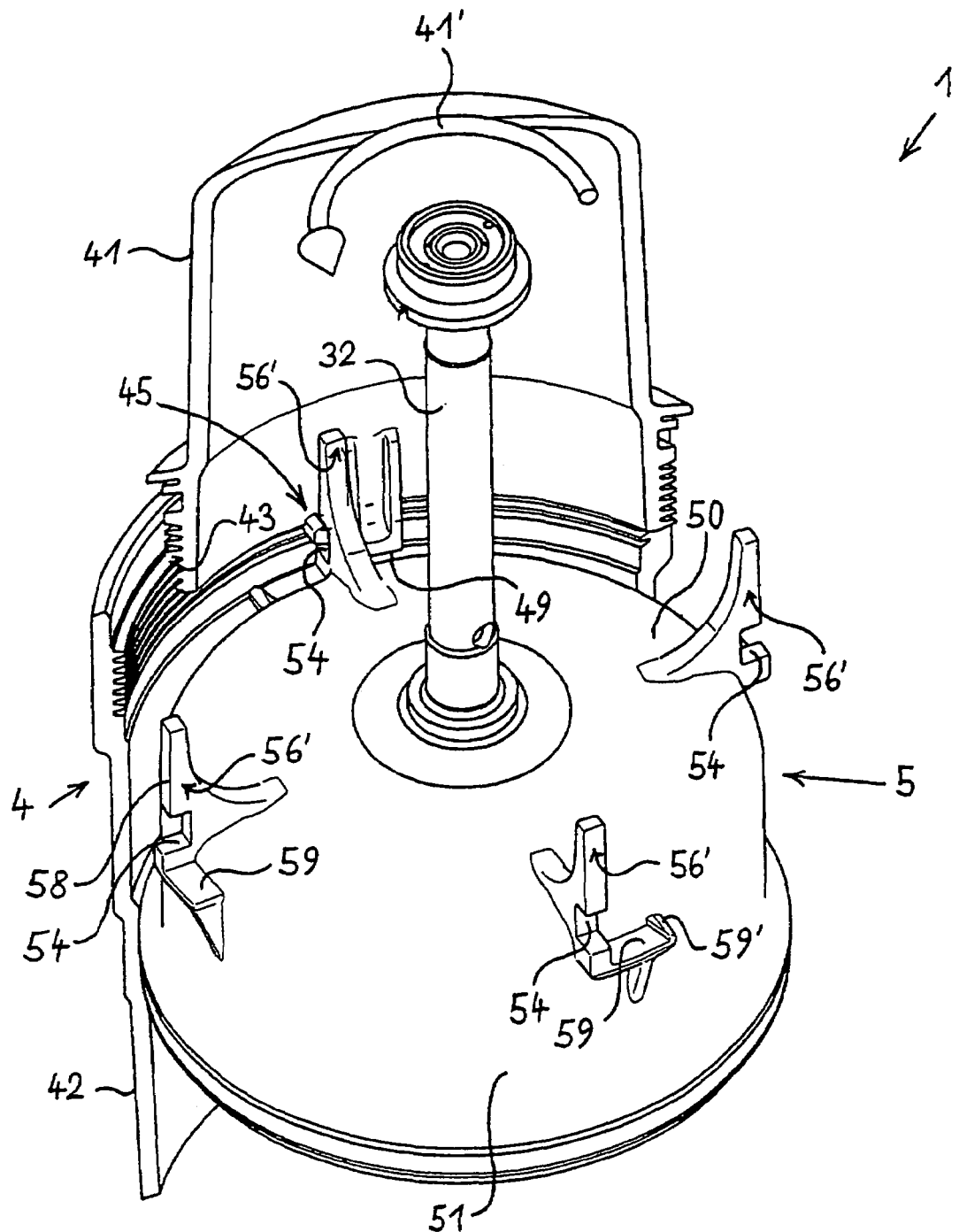
FIG. 11 is a view of the device of FIG. 9 in the same type of representation as in FIG. 10, however, now with partially loosened screw cap.

FIG. 11 of the drawing now shows the device 1 of FIG. 1 and FIG. 10 at the beginning of rotating the screw cap 41 in its loosening rotational direction. The loosening rotational direction is represented by the rotary arrow 41'.

By the screw cap 41 being rotated in the sense of the rotary arrow 41', the connection means 45 at the screw cap 41 are brought into contact with the connection means 54 at the intermediate cap 5, as can be seen to the upper left of FIG. 11. Since the screw cap 41 is represented in a broken view in FIG. 11, the three further connection means 45 of the screw cap 41 cannot be seen, but they engage the further connection means 54 of the intermediate cap 5 in the same manner.

When the screw cap 41 is further rotated in its loosening rotational direction 41', the intermediate cap 5 is also turned in the loosening rotational direction thereof as well as taken along in an axially upward direction in the manner desired, thus being moved out of the lower part 42 of the housing 4.

Figure 12:
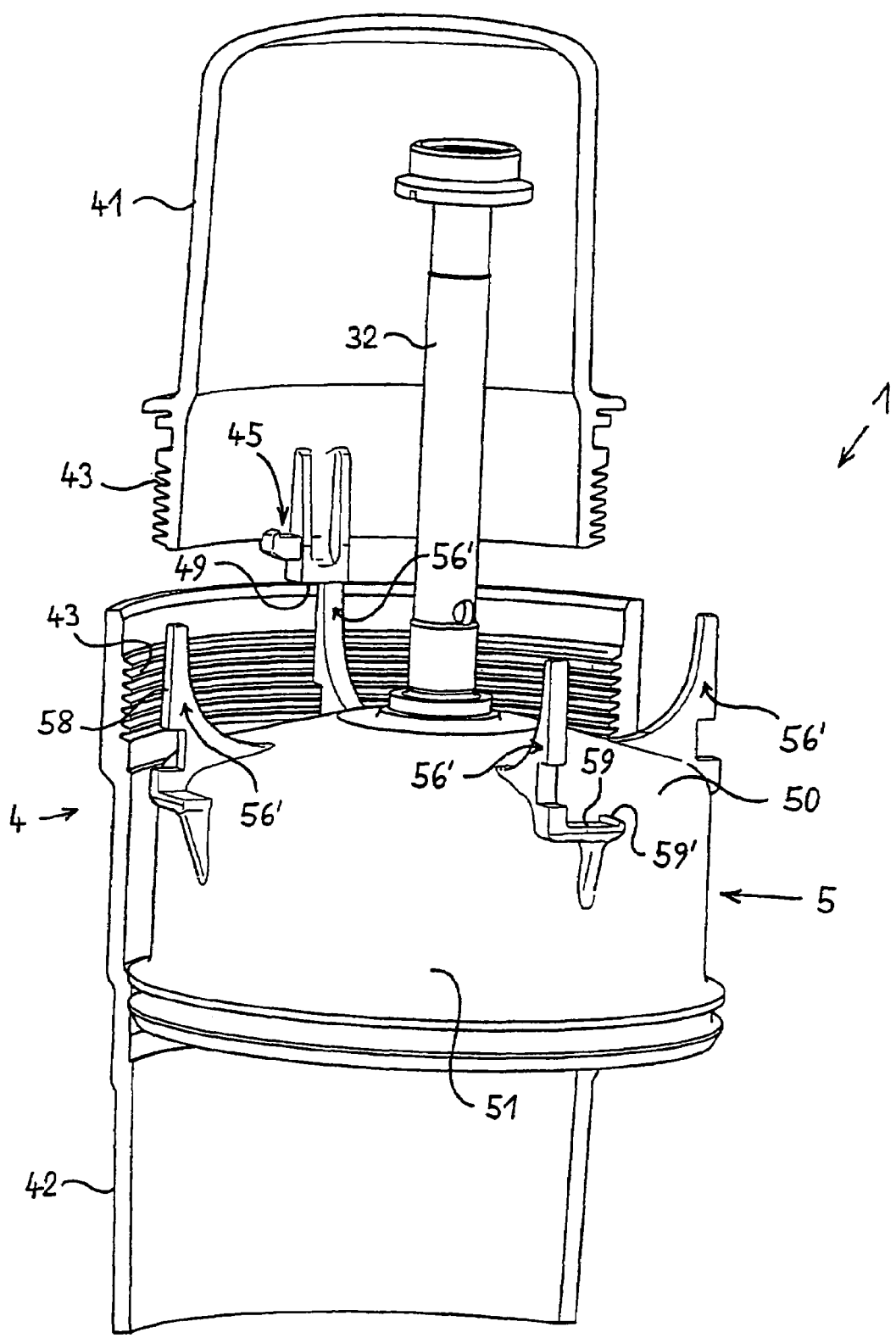
FIG. 12 is a view of the device of FIG. 9 in the same type of representation as in FIGS. 10 and 11, however, now with fully loosened screw cap.

FIG. 12 finally shows the screw cap 41 in a state where it is completely loosened and separated from the lower part 42 of the housing 4. Hence, the thread 43 is now disengaged from the screw cap 41 and the lower housing part 42. The individual parts of the device 1 that have initially been detached jointly from the stationary housing part 42 can now be separated from each other by a simple rotary motion and the parts to be exchanged, here the centrifuge rotor and the filter element, can be replaced.

As can be clearly seen at the lower region of the loosened screw cap 41 shown in FIG. 12, the connection means 45 project a little in downward direction, thus causing the lower edge 49 of the screw cap 41 to be positioned a little lower than the lower edge of the thread 43 at the screw cap 41. At the same time, the wings 56' at the intermediate cap 5 project in an axially upward direction to such an extent that the connection means 45 of the screw cap 41 and the wings 56' of the intermediate cap 5 overlap each other before the threads 43 engage each other. This reliably prevents the bottom edge 49 from seating on the upper end of the wings 56' from above as seen in axial direction, while the screw cap 41 is being rotated in its tightening rotational direction, so that any cantings thereby caused when the screw cap 41 is rotated in its tightening rotational direction are also prevented. On the contrary, the threads 43 can engage only when the connection means 45 are positioned between two neighboring wings 56' of the screw cap 5, as seen in axial direction.

As is apparent from the foregoing specification, the invention is susceptible of being embodied with various alterations and modifications which may differ particularly from those that have been described in the preceding specification and description. It should be understood that 1 wish to embody within the scope of the patent warranted hereon all such modifications as reasonably and properly come within the scope of my contribution to the art.

The invention claimed is:

1. A device for separating impurities from the lubricating oil of an internal combustion engine comprising:
   a two piece housing comprising a stationary lower housing part and a removable upper screw cap,
   a filter element,
      said filter element being arranged in said two-piece housing that is closed during operation of the device and,
      said screw cap and said filter element comprising detachable connection means which can be brought into contact and are used to transmit axial tractive forces,
      said filter element being removed from said housing by means of said connection means when said screw cap is rotated in its loosening rotational direction,
      said connection means being arranged to be brought into contact by rotating said screw cap in its loosening rotational direction and arranged to be disengaged by rotating said screw cap in a tightening rotational direction.

2. A device according to claim 1, wherein an angle of rotation covered by said screw cap between a disengaged position and an engaged position of said connection means ranges from approximately 15 degrees to 30 degrees.

3. A device according to claim 1, wherein said connection means on said filter element are formed by a concentric circle of snap-on hooks formed at an upper end disk of said filter element, and said connection means on said screw cap are formed by a ring with cam segments that is concentrically arranged at a bottom side of an upper part of said screw cap, wherein, in a first rotational position that can be adjusted by rotating said screw cap in its tightening rotational direction, said circle of snap-on hooks can be moved in an axial direction into said ring and out of said ring with said cam segments in relation to each other, and wherein, in a second rotational position that can be adjusted by rotating said screw cap in its loosening rotational direction, said circle of snap-on hooks that has been moved into said ring cannot be moved out of said ring with said cam segments in axial direction in relation to each other.

4. A device according to claim 3, wherein said ring with said cam segments is inserted in a recess of said screw cap as a separate component such that it can neither be rotated nor lost.

5. A device according to claim 3, wherein said screw cap including its ring with said cam segments is a single-piece injection-molded part of plastic.

6. A device according to claim 1, wherein said screw cap, said upper end disk of said filter element as well as said intermediate cap if necessary and, if need be, said ring with said cam segments are each single-piece injection-molded parts of plastic.

7. A device for separating impurities from the lubricating oil of an internal combustion engine, comprising:
   a common two-piece housing that is closed during operation of the device and comprises a removable upper screw cap and a stationary lower housing part,
   a filter element at a bottom of the device and, on top of said filter element, a centrifuge with a rotor drivable by means of lubricating oil flowing through it, wherein said filter element and said centrifuge are arranged, one above the other, in said two-piece housing,
   a removable intermediate cap arranged in said housing between said filter element and said centrifuge,
      said intermediate cap and said filter element comprising first detachable connection means which can be brought into contact and are used to transmit axial tractive forces, and wherein said centrifuge, said intermediate cap and said filter element can be removed from said housing while the latter is in its open state, said screw cap and said intermediate cap additionally comprise second detachable connection means that can be brought into contact and are used to transmit axial tractive forces, said second connection means arranged to be brought into contact by rotating said screw cap in its loosening rotational direction in relation to said intermediate cap and arranged to be disengaged by rotating said screw cap in its tightening rotational direction in relation to said intermediate cap, and said connection between said first connection means being formed as a locking connection, wherein said connection means on said filter element are formed by a circle of locking hooks with locking noses.

8. A device according to claim 7, wherein said intermediate cap has a shape of a bell and comprises at its outer perimeter axially extending fins each of which is provided with at least one broadening or aperture pointing in circumferential direction, and that said screw cap comprises at its lower edge hooks or noses that are pointing in its loosening rotational direction and can be brought into contact with said broadenings or apertures by rotating said screw cap in its loosening rotational direction in relation to said intermediate cap and can be disengaged by rotating said screw cap in its tightening rotational direction in relation to said intermediate cap.

9. A device according to claim 8, wherein said fins that comprise said broadenings or apertures are, at the same time, used as stabilization and force diverting fins for reinforcing said intermediate cap and for diverting onto said screw cap such forces that are caused by an oil pressure below said intermediate cap in said interior region of said housing.

10. A device according to claim 8, wherein said broadenings or apertures on the one hand and/or said hooks or noses on the other hand are each provided with a slope or step at their surfaces that are brought into contact, said slope or step securing the engaged position.

11. A device according to claim 7, wherein said intermediate cap has a shape of a bell and comprises, in a radially outer region of its upper side, several wings that are pointing in an axially upward direction, are spaced apart from each other in circumferential direction and are each provided with at least one broadening or aperture pointing in circumferential direction or with a depression used as connection means and recessing in a radially inward direction, and that said screw cap comprises at its lower edge hooks or noses as connection means that are pointing in said loosening rotational direction of said screw cap or in a radially inward direction, wherein said connection means can be brought into contact with said connection means of said intermediate cap by rotating said screw cap in its loosening rotational direction in relation to said intermediate cap and can be disengaged by rotating said screw cap in its tightening rotational direction in relation to said intermediate cap.

12. A device according to claim 11, wherein said second connection means are arranged and designed such that, before their thread engagement, said second connection means overlap each other in axial direction when said screw cap is placed onto said stationary housing part.

13. A device according to claim 11, wherein said wings comprise, at their radially outer end, a guide contour fitting in said interior region of said screw cap with motional play.

14. A device according to claim 11, wherein a step is provided at or next to each of said wings, said step projecting in a radially outward direction and forming the basis on which a lower edge of said screw cap is supported when said screw cap is in said tightened state.

15. A device according to claim 14, wherein a part of said steps at that end of said screw cap that is pointing in said loosening rotational direction thereof each comprises an edge projecting in upward direction.

16. A device according to claim 11, wherein said wings are connected to each other via a continuous circumferential collar or are joined to form a continuous circumferential collar.

17. A device according to claim 7, wherein said screw cap, said upper end disk of said filter element as well as said intermediate cap if necessary and, if need be, said ring with said cam segments are each single-piece injection-molded parts of plastic.

18. A device for separating impurities from the lubricating oil of an internal combustion engine, comprising:

a common two-piece housing that is closed during operation of the device and comprises a removable upper screw cap and a stationary lower housing part, a filter element at a bottom of the device and, on top of said filter element, a centrifuge with a rotor drivable by means of lubricating oil flowing through it, wherein said filter element and said centrifuge are arranged, one above the other, in said two-piece housing, a removable intermediate cap arranged in said housing between said filter element and said centrifuge, said intermediate cap and said filter element comprising first detachable connection means which can be brought into contact and are used to transmit axial tractive forces, and wherein said centrifuge, said intermediate cap and said filter element can be removed from said housing while the latter is in its open state, said screw cap and said intermediate cap additionally comprise second detachable connection means that can be brought into contact and are used to transmit axial tractive forces, said second connection means arranged to be brought into contact by rotating said screw cap in its loosening rotational direction in relation to said intermediate cap and arranged to be disengaged by rotating said screw cap in its tightening rotational direction in relation to said intermediate cap, and said connection between said first connection means is designed as a rotary connection, wherein said first connection means can, in relation to said filter element, be brought into contact by rotating said screw cap in its loosening rotational direction, said screw cap taking along said intermediate cap, and can, in relation to said filter element, be disengaged by rotating said intermediate cap in an opposite direction.

19. A device according to claim 18, wherein an angle of rotation covered by said screw cap between said disengaged position and said engaged position of said first and second connection means in relation to said filter element ranges approximately from approximately 45 degrees to 120 degrees.

20. A device according to claim 18, wherein said intermediate cap has a shape of a bell and comprises at its outer perimeter axially extending fins each of which is provided with at least one broadening or aperture pointing in circumferential direction, and that said screw cap comprises at its lower edge hooks or noses that are pointing in its loosening rotational direction and can be brought into contact with said broadenings or apertures by rotating said screw cap in its loosening rotational direction in relation to said intermediate cap and can be disengaged by rotating said screw cap in its tightening rotational direction in relation to said intermediate cap.

21. A device according to claim 20, wherein said fins that comprise said broadenings or apertures are, at the same time, used as stabilization and force diverting fins for reinforcing said intermediate cap and for diverting onto said screw cap such forces that are caused by an oil pressure below said intermediate cap in said interior region of said housing.

22. A device according to claim 20, wherein said broadenings or apertures on the one hand and/or said hooks or noses on the other hand are each provided with a slope or step at their surfaces that are brought into contact, said slope or step securing the engaged position.

23. A device according to claim 18, wherein said intermediate cap has a shape of a bell and comprises, in a radially outer region of its upper side, several wings that are pointing in an axially upward direction, are spaced apart from each other in circumferential direction and are each provided with at least one broadening or aperture pointing in circumferential direction or with a depression used as connection means and recessing in a radially inward direction, and that said screw cap comprises at its lower edge hooks or noses as connection means that are pointing in said loosening rotational direction of said screw cap or in a radially inward direction, wherein said connection means can be brought into contact with said connection means of said intermediate cap by rotating said screw cap in its loosening rotational direction in relation to said intermediate cap and can be disengaged by rotating said screw cap in its tightening rotational direction in relation to said intermediate cap.

24. A device according to claim 23, wherein said second connection means are arranged and designed such that, before their thread engagement, said second connection means overlap each other in axial direction when said screw cap is placed onto said stationary housing part.

25. A device according to claim 23, wherein said wings comprise, at their radially outer end, a guide contour fitting in said interior region of said screw cap with motional play.

26. A device according to claim 23, wherein a step is provided at or next to each of said wings, said step projecting in a radially outward direction and forming the basis on which a lower edge of said screw cap is supported when said screw cap is in said tightened state.

27. A device according to claim 26, wherein a part of said steps at that end of said screw cap that is pointing in said loosening rotational direction thereof each comprises an edge projecting in upward direction.

28. A device according to claim 23, wherein said wings are connected to each other via a continuous circumferential collar or are joined to form a continuous circumferential collar.

29. A device according to claim 18, wherein said filter-element-side connection means are formed by a concentric circle of snap-on hooks that is present at an upper end disk of said filter element, and that said associated connection means of said intermediate cap are formed by a ring with cam segments that is concentrically arranged at a bottom side of said upper part of said intermediate cap, wherein, in a first rotational position that can be adjusted by rotating in tightening rotational direction, said circle of snap-on hooks can be moved in axial direction into said ring and out of said ring with said cam segments in relation to each other and wherein, in a second rotational position that can be adjusted by rotating in loosening rotational direction, said circle of snap-on hooks that has been moved into said ring cannot be moved out of said ring with said cam segments in an axial direction in relation to each other.

30. A device according to claim 29, wherein said intermediate cap including its ring with said cam segments is a single-piece injection-molded part of plastic.

31. A device according to claim 18, wherein said ring with said cam segments is inserted in a recess of said intermediate cap as a separate component such that it can neither be rotated nor lost.

32. A device according to claim 18, wherein said connection means that are provided as rotary connection means are designed in the form of a bayonet lock or as a short-length thread.

33. A device according to claim 18, wherein said screw cap, said upper end disk of said filter element as well as said intermediate cap if necessary and, if need be, said ring with said cam segments are each single-piece injection-molded parts of plastic.

* * * * *